US008006259B2

(12) United States Patent
Drake et al.

(10) Patent No.: US 8,006,259 B2
(45) Date of Patent: Aug. 23, 2011

(54) REAL-TIME AUDIENCE MONITORING, CONTENT RATING, AND CONTENT ENHANCING

(75) Inventors: Eddie Drake, Bothell, WA (US); Xiping Long, Issaquah, WA (US); Padmaja Vrudhula, Seattle, WA (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 577 days.

(21) Appl. No.: 11/894,416

(22) Filed: Aug. 21, 2007

(65) Prior Publication Data

US 2007/0294740 A1 Dec. 20, 2007

Related U.S. Application Data

(62) Division of application No. 09/945,350, filed on Aug. 31, 2001, now Pat. No. 7,363,643.

(60) Provisional application No. 60/229,631, filed on Aug. 31, 2000.

(51) Int. Cl.
*H04N 7/16* (2011.01)
*H04N 7/173* (2011.01)
*H04H 60/32* (2008.01)

(52) U.S. Cl. .......... 725/13; 725/108; 725/131; 725/139; 725/151

(58) Field of Classification Search ............... 725/9–21, 725/108, 131, 139, 151
See application file for complete search history.

(56) References Cited

U.S. PATENT DOCUMENTS

| 5,600,364 | A | | 2/1997 | Hendricks |
| 5,619,252 | A | * | 4/1997 | Nakano ................. 348/14.01 |
| 5,857,190 | A | | 1/1999 | Brown |
| 5,872,588 | A | * | 2/1999 | Aras et al. .................. 725/14 |
| 5,944,608 | A | * | 8/1999 | Reed et al. ................. 463/40 |
| 6,026,430 | A | | 2/2000 | Butman |
| 6,038,601 | A | | 3/2000 | Lambert |
| 6,469,753 | B1 | | 10/2002 | Klosterman |

(Continued)

FOREIGN PATENT DOCUMENTS

EP 0773687 5/1997
WO WO98/31114 6/1998

OTHER PUBLICATIONS

Center for Digital Democracy, "TV That Watches You: The Prying Eyes of Interactive Television", Jun. 1, 2001, pp. 1-30.

(Continued)

*Primary Examiner* — Dominic D Saltarelli
(74) *Attorney, Agent, or Firm* — Michael Haynes PLC; Michael N. Haynes

(57) ABSTRACT

A method, system, and computer-readable medium for collecting usage information in real-time for a computing device receiving digital content for presentation, such as to enable various types of real-time content modifications or content-related service enhancements. In some situations, real-time information is collected about Set-Top Boxes that allow viewers to receive various types of content (e.g., video broadcasts such as single-channel or multi-channel television programming, audio broadcasts, media-on-demand, etc.) and to interact with the content and with related services in various ways, such as information about content viewing and types of viewer interactions. Having access to information related to content viewing and to various types of user interactions provides a variety of benefits, with real-time or near real-time collection of such information enabling dynamic modifications to provided content, functionality, and services.

35 Claims, 15 Drawing Sheets

U.S. PATENT DOCUMENTS 6,698,020 B1   2/2004   Zigmond
6,918,131 B1   7/2005   Rautila

OTHER PUBLICATIONS

Kary, Tiffany, "Interactive TV Tunes into Privacy Concerns", CNET News.com: htttp://news.cnet.com/news/0-1055-200-6732232.html?tag=mn_hd Accessed Dec. 17, 2001.

Nielsen Media Research, "Customer Critical Reporting and Data Warehousing Functions Based on Sun Server and Storage Technology"—http://www.sun.com/storage/success-stories/nielsen.html, Accessed Dec. 17, 2001.

Nielsen Media Research, "Who We Are and What We Do", http://www.nielsenmedia.com/top_frame.html Accessed Jan. 7, 2002.

Tivo, Inc., "White Paper Submitted to the Federal Trade Commission", May 3, 2001, U.S.

* cited by examiner

| Interaction Event 300 | | |
|---|---|---|
| 310 | Event ID | <10 characters> 312 |
| 314 | Event Type | <6 characters> 316 |
| 318 | MAC Address | <20 characters> 320 |
| 322 | IP Address | <20 characters> 324 |
| 326 | Subscriber ID | <integer> 328 |
| 330 | Viewer ID | <integer> 332 |
| 334 | Date/Time Start | <timestamp> 336 |
| 338 | Date/Time End (only channel change events) | <timestamp> 340 |
| 342 | Item ID (only if applicable) | <integer> 344 |
| 346 | URL (only if applicable) | <256 characters> 348 |
| 350 | Error Message (only if applicable) | <variable length character> 352 |
| 354 | Error Details (only if applicable) | <variable length and data type> 356 |

REAL-TIME AUDIENCE MONITORING, CONTENT RATING, AND CONTENT ENHANCING

CROSS-REFERENCE TO RELATED APPLICATION(S)

This application is a divisional of, claims priority to, and incorporates herein by reference in its entirety, U.S. patent application Ser. No. 09/945,350, titled "Real-Time Audience Monitoring, Content Rating, and Content Enhancing", filed 31 Aug. 2001, now U.S. Pat. No. 7,363,643 which claims priority to U.S. Provisional Application No. 60/229,631, titled "An Automatic Real Time Audience Monitoring and Rating System for Broadband Networks", filed 31 Aug. 2000.

TECHNICAL FIELD

The following disclosure relates generally to monitoring usage of a computing device, and more particularly to monitoring audiences as they receive and interact with digital content, such as in real-time in order to dynamically rate content usage or to enhance in real-time the content and content-related services that are provided.

BACKGROUND

The television and radio industries, as well as commercial advertisers, have an obvious interest in knowing the number of people watching or listening to particular stations and programs at a particular time. Existing audience monitoring and rating systems are based on connecting extra meters to TV sets and radios, however, even when using the Digital Encoding technology (DEC).

Another fundamental problem with the current technology and processes is the audience sampling size. For example, the leading company in audience rating for over forty years, Neilsen Media Research, Inc. can only sample about 5,000 households and 13,000 people in selected regions around world. In addition to the small sampling size, their technology requires manual operations from the persons involved in the study.

Due to the difficulties with present techniques, a need exists for techniques to obtain audience data directly and automatically from the software and devices used to provide broadband network service, such as in a real-time manner. This need is preferably addressed without extra monitoring devices or manual operations from subscribers or viewers.

BRIEF DESCRIPTION OF THE DRAWINGS

FIG. 3 illustrates an example of an interaction event data structure that can be used to report various types of interaction events.

DETAILED DESCRIPTION

A software facility is described below that collects usage information for a computing device receiving digital content for presentation, such as in real-time or near real-time in order to enable various types of dynamic real-time content modifications or content-related service enhancements. In some embodiments, real-time information is collected about Set-Top Boxes ("STBs") that allow viewers to receive various types of content (e.g., video broadcasts such as single-channel or multi-channel television programming, single-channel or multi-channel audio broadcasts, audio-on-demand, video-on-demand, etc.) and to interact with the content and with related services in various ways. Having access to information related to content viewing (used generally herein to include viewing visual information and/or listening to audio information) and to various types of user interactions provides a variety of benefits, as discussed in greater detail below, such as real-time or near real-time collection of such information enabling dynamic real-time modifications to provided content, functionality, and services.

For illustrative purposes, some embodiments are described below in which STBs that are connected to TVs are monitored and in which various types of TV-related services are provided based on real-time or near real-time usage and interaction information. In addition, in some embodiments the STBs are connected to switched telephone network Central Offices (e.g., via DSL lines) and packet-switched IP data routing is used to provide information about viewer interactions (e.g., content selection and other content viewing interactions), such as for viewers that are subscribers of a service providing various types of content and content-related services. However, those skilled in the art will appreciate that the techniques of the invention can be used in a wide variety of other situations, some of which are noted below.

Figure 1A:
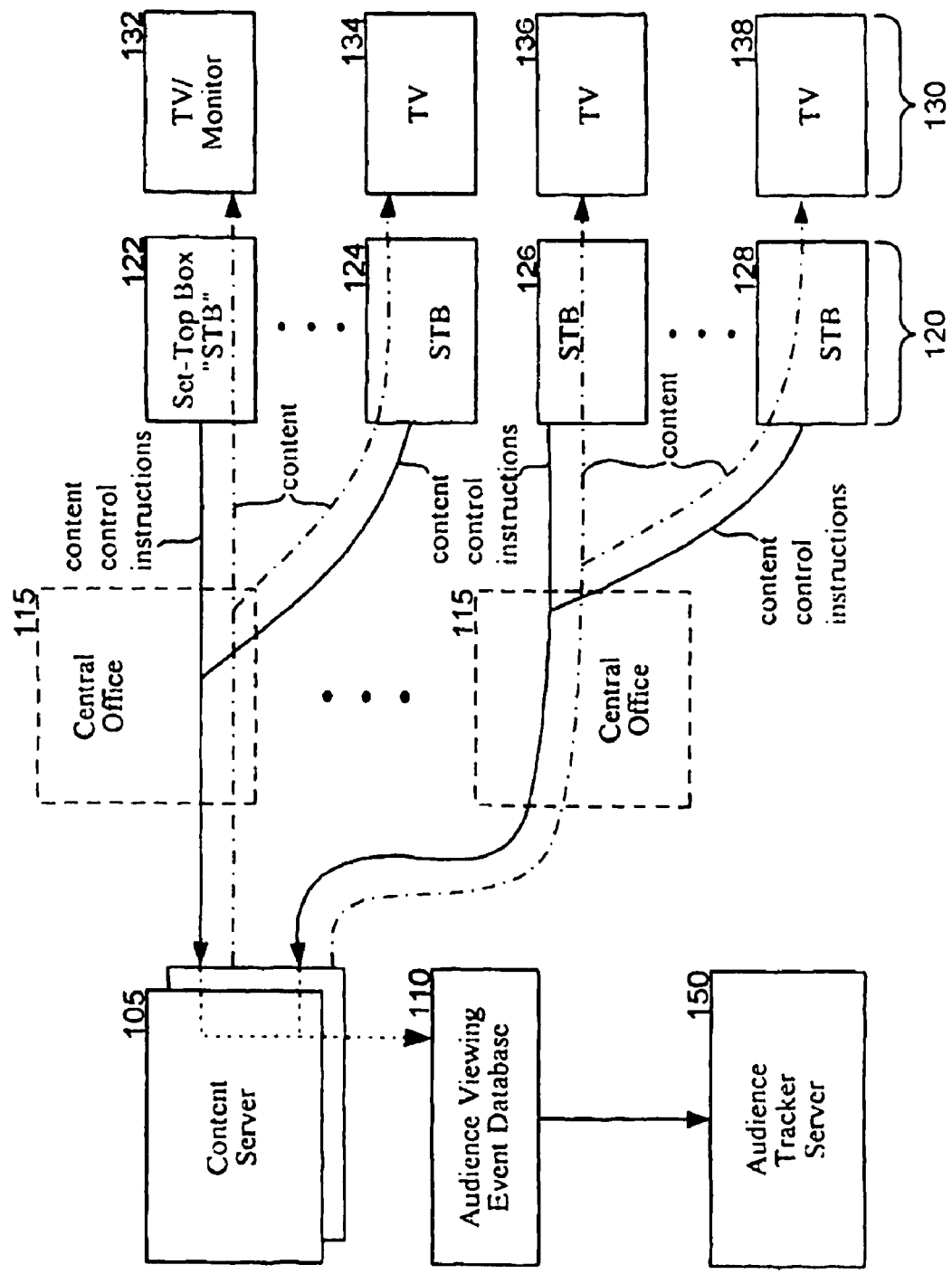
FIGS. 1A and 1B illustrate embodiments of techniques for collecting audience interaction events.
Figure 1B:
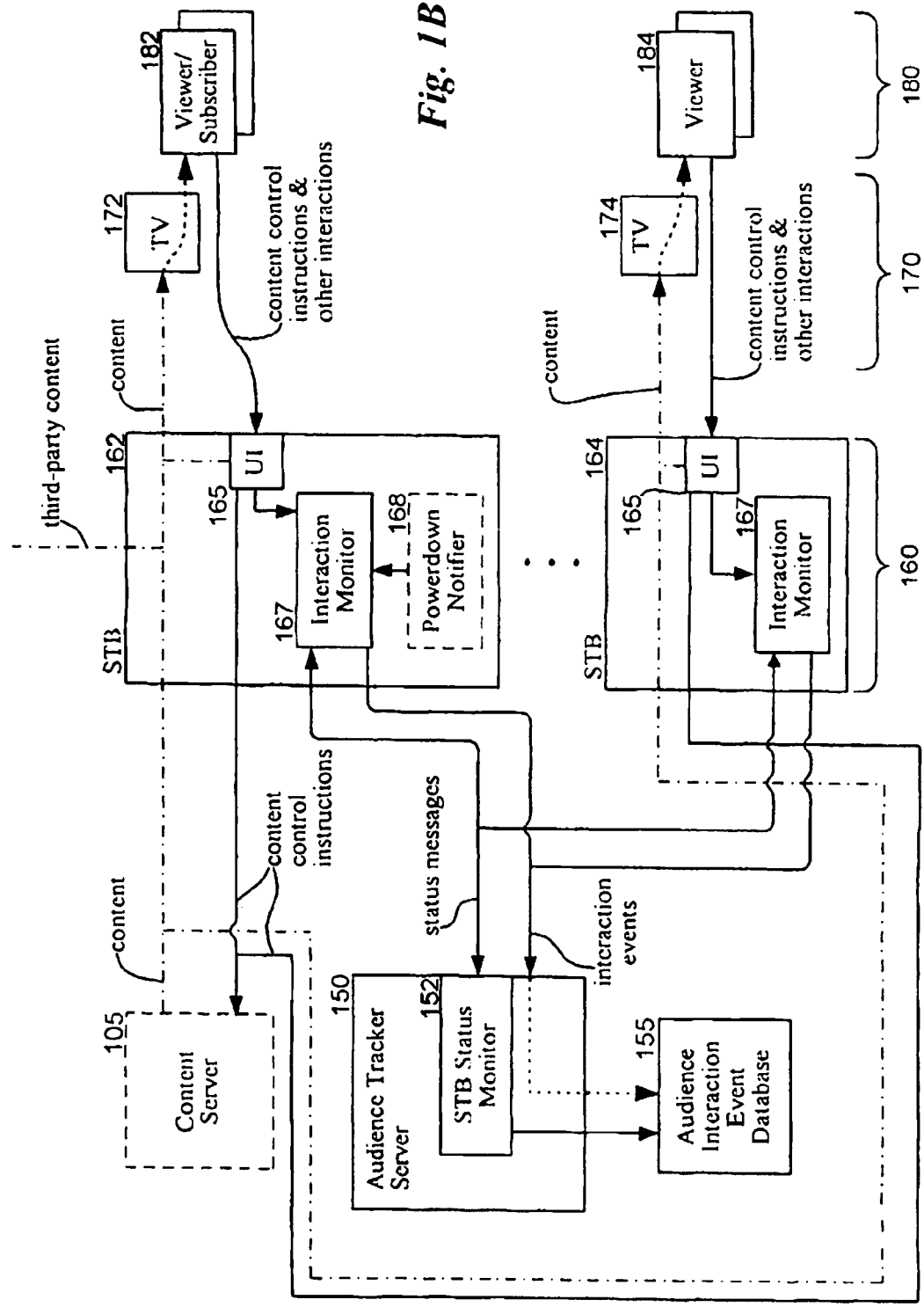

FIGS. 1A and 1B illustrate embodiments of collecting information about audience interactions, including content control instructions (e.g., changing a channel in a multi-channel content delivery system). FIG. 1A illustrates one or more Content Servers 105 (also referred to as a "content provider" or "content provider server") that provide various types of content to multiple STBs 120. Each STB is connected to one or more corresponding TVs or other display monitors 130, and each TV has one or more viewers (not shown) that are viewing or otherwise experiencing content provided by the Content Servers. In some embodiments, one or more of the viewers at each TV is a subscriber to a service provided by the Content Servers, such as to provide TV programming, video-on-demand, audio channels, audio-on-demand, Internet-based content, voice-over-IP and other IP telephony, and/or various other types of content.

In the illustrated embodiment, the Content Servers communicate with the STBs using packet-switched technology (e.g., IP transmissions), and use one or more Central Office telephone switches 115 to assist in the distribution of the content to the STBs along a circuit-based path (e.g., DSL lines). The use of an intermediary transmitting device such as a Central Office allows the Content Servers to efficiently provide the same information via a multi-cast to many different STBs. For example, the Content Servers can provide a single copy of multi-cast content to the first Central Office, and that Central Office can then transmit a copy of the content to each of the STBs connected to that Central Office, including STB 122 and STB 124. Other STBs may also receive that same multi-cast content, such as STB 126 via a copy of the content that is transmitted to the second Central Office. The use of packet-switched technology by the Content Servers also allows some or all of the STBs to receive individualized content via a single-cast to that STB (also referred to as a "uni-cast"). For example, while STBs 122, 124, and 126 are receiving the same content via a multi-cast, STB 128 may be receiving different content via a single-cast, with that different content also being supplied to the second Central Office and then forwarded to STB 128.

In addition to the content being sent from the Content Servers to the STBs, various types of information can also be sent from the STBs to the Content Servers (via the Central Offices in the illustrated embodiment). For example, each STB may provide content control instructions to the Content Servers to indicate the type of content that they wish to currently receive. In a multi-channel content providing situation (e.g., television programming), for example, a content control instruction can include changing the channel. Thus, if STBs 122, 124, and 126 were each receiving the same channel of information via a multi-cast, STB 124 could at any time indicate to the Content Servers to change the channel and thus leave that multi-cast, such as to join a different multi-cast corresponding to the newly selected channel. Various other types of content control instructions can similarly be supplied to the Content Servers, such as selecting a specific audio or video content segment for a single-cast (e.g., video-on-demand or audio-on-demand), instructions to adjust the flow of content in a single-cast if VCR-style controls for content being provided are available (e.g., Pause, Fast Forward, etc.), etc. Such content control instructions will typically originate from one or more of the viewers watching the TV to which an STB is connected.

In the illustrated embodiment, the Content Servers track events indicating what content each STB is receiving (and thus what content is being viewed by the viewers of the display device for that STB), such as based on content control instructions received from the STBs. The Content Servers in the illustrated embodiment then store such audience viewing events in an Audience Viewing Event Database 110. Such viewing event information can then be used to provide a variety of benefits, as discussed in greater detail below. In particular, in the illustrated embodiment the Audience Viewing Event Database is accessible to other computing devices, including in the illustrated embodiment an Audience Tracker Server 150 that can obtain and use various information from the event database. Since the content control instructions will typically be provided to the Content Servers in a reliable and timely manner, the Audience Viewing Event Database will typically include real-time information that accurately indicates the content being provided to each STB, and this real-time information can then be used to provide a variety of real-time content modifications or content enhancements as discussed below.

FIG. 1B illustrates an alternate embodiment for collecting information related to audience viewing interactions, and can additionally collect various other types of information related to the STBs including information about various other types of interactions by viewers with those STBs. In particular, in the illustrated embodiment each enhanced STB 160 includes an Interaction Monitor component 167 that monitors various information related to the STBs and sends that information to the Audience Tracker Server 150 (also referred to as an "event server"). The Interaction Monitor components can also receive and respond to various types of status messages sent from the Audience Tracker Server, such as to determine if the STB is still alive (i.e., is connected and functioning properly) or to gather various types of information. In the illustrated embodiment, STB 162 is receiving content from one or more content sources, such as an optional Content Server 105 and/or third-party content (e.g., multi-channel cable-based or satellite-based TV programming) that is not under the control of the Audience Tracker Server or any of the content enhancement services.

Each of the STBs in the illustrated embodiment also includes a UI component 165 that can provide or modify content being provided to the TV associated with the STP (e.g., to display a menu of services or to select one of multiple channels from multi-channel content provided by a third party). The UI component receives content control instructions as well as any other viewer interactions, and processes those in an appropriate way. For example, if content is being received from a Content Server, the UI component will forward content control instructions to the Content Server for processing. Alternately, the UI component can provide or modify available content in other instructed ways, such as to select one of multiple channels provided in available third-party content or to generate various type of information to replace or supplement (e.g., overlay) the available content.

In the illustrated embodiments, a UI component also notifies the Interaction Monitor for that STB of any interactions with or by the viewers. The Interaction Monitor can then notify the Audience Tracker Server of some or all of the viewer interactions, such as in real-time upon occurrence of the interaction or instead in near real-time, such as by gathering interaction occurrence information for multiple interactions over a brief period and then transmitting it together in a batch. In the illustrated embodiment, the Interaction Monitor communicates with the Audience Tracker Server via packet-switched technology, such as via IP packets. In some embodiments, an interaction event (also referred to as an "event message") notification sent by the Interaction Monitor will be provided in a reliable manner, such as by using the TCP/IP protocol or some other reliable transmission protocol. In alternate embodiments, interaction event information will be sent using a lower-overhead but unreliable transportation mechanism, such as UDP/IP and/or the Internet Group Membership Protocol (IGMP).

Such interaction events can provide a variety of types of information. For example, types of interaction events can include subscriber/viewer-initiated events, remote software update events, subscriber/viewer-initiated error events, and/or STB error events, and each type of event can provide various information specific to that event type and to that particular occurrence. Subscriber/viewer-initiated events can take a variety of forms, such as viewing/changing a channel, viewing UI screens (e.g., a main screen for video-on-demand), viewing a preview of a video or audio selection, renting or purchasing a selection, viewing information via a single-cast and specifying VCR-style commands to adjust the flow of the content, surfing the World Wide Web, selecting a category of media-on-demand information, viewing an interactive program guide related to video or audio selections that are available, etc.

In some embodiments, such as the illustrated STB 162, the STB may include hardware and software to support notifications to the Audience Tracker Server when a sudden powerdown event occurs. For example, the STB may include a battery backup to supplement the power that is normally received via AC, as well as a software component that notes a powerdown occurrence and quickly sends a powerdown event notification to the Audience Tracker Server while power remains in the backup system, such as via the Interaction Monitor.

After the Audience Tracker Server receives event information from the various Interaction Monitors, the information is forwarded to an Audience Interaction Event Database 155. This Event Database can then provide access not only to information about the content currently being provided to each of the STBs but also to information about other types of interactions performed by the viewers (e.g., viewing a UI-generated information screen). As previously noted, the information forwarded to the Event Database can include real-time information and near real-time information, and in some embodiments may also receive recent information that is not near real-time.

In some embodiments, the Audience Tracker Server also includes an STB Status Monitor component 152 that initiates communications with the Interaction Monitors in order to gather information. The information gathering can be initiated in various ways, such as on a periodic basis, in response to a need for the information, or if information has not been received from an STB for a specified period of time. In some embodiments, the status messages sent by the STB Status Monitor include Ping commands (e.g., in conjunction with the Internet Control Management Protocol (ICMP)) to determine if an STB is alive. Alternatively, the status messages could be used in some embodiments to gather more detailed information about the STB (e.g., a current configuration) and/or to solicit information of various types from the current viewers. As with the viewing event information available in the Audience Viewing Event Database, the more inclusive real-time audience interaction event information available in the Audience Interaction Event Database can be used to provide a variety of benefits, such as with various content enhancement services discussed in greater detail below.

Additional details about one set of techniques for receiving full-motion digital video multi-casts, interactive data and interactive voice via a DSL circuit are described in pending U.S. patent application Ser. No. 08/991,391, filed Dec. 16, 1997 and entitled "METHOD AND APPARATUS FOR RECEIVING FULL-MOTION DIGITAL VIDEO MULTI-CASTS, INTERACTIVE DATA AND INTERACTIVE VOICE VIA A DSL CIRCUIT", which is hereby incorporated by reference in its entirety.

Figure 2:
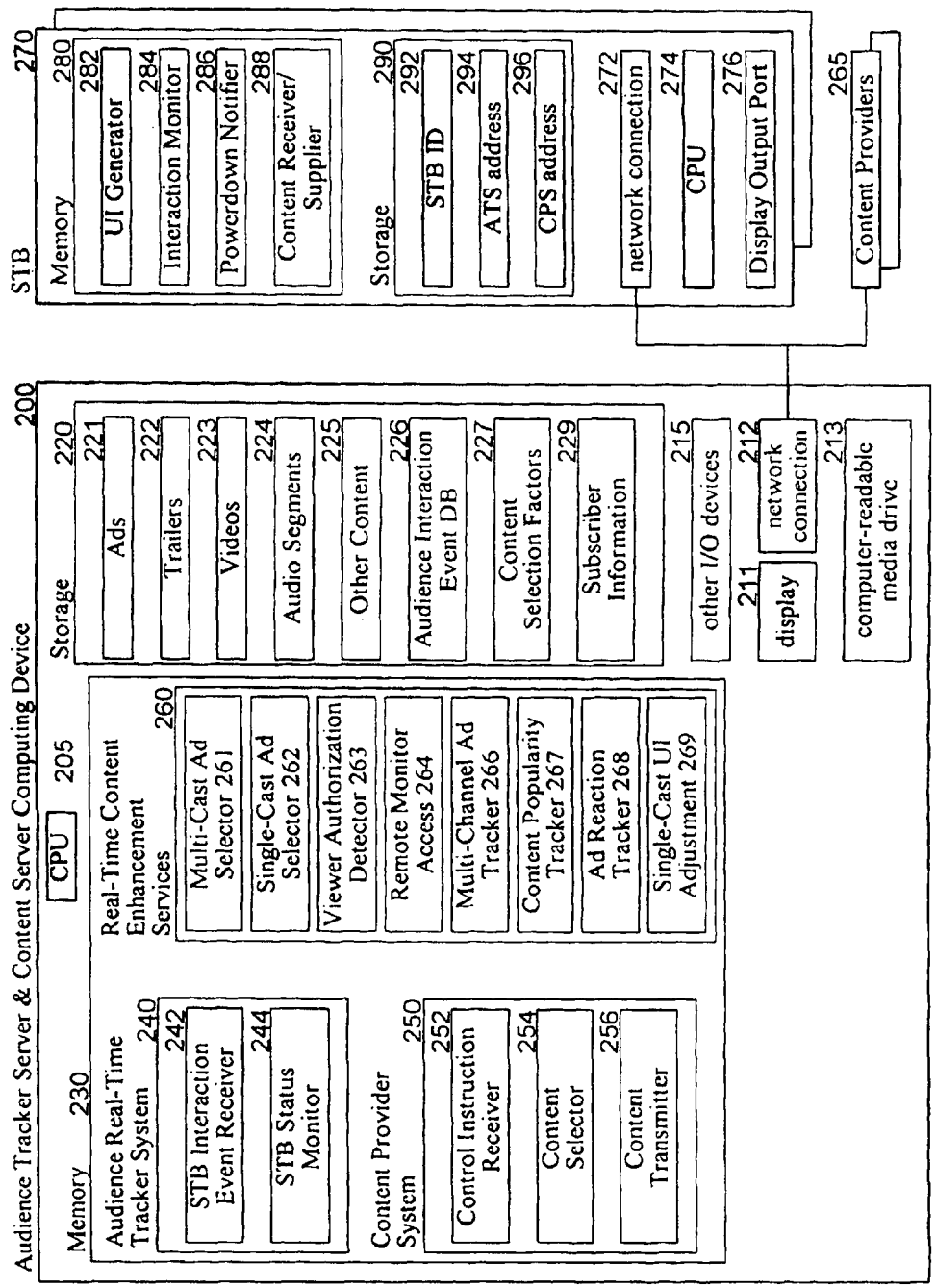
FIG. 2 illustrates a computing device suitable for executing embodiments of an Audience Tracker Server and a Content Server.

FIG. 2 illustrates an example computing device 200 suitable for executing embodiments of both an Audience Tracker Server and a Content Server. The computing device 200 is connected to multiple STB computing devices 270, and the Content Server and/or the STBs can optionally be connected to one or more third-party content providers 265. Those skilled in the art will appreciate that in other embodiments the Audience Tracker Server and Content Server may be embodied in different computing devices or may not both be present, and that other components that are not illustrated (e.g., Central Offices or other intermediary devices) may be used.

In the illustrated embodiment, the computing device 200 includes a CPU 205, storage 220, memory 230, and various I/O devices 211-215. The I/O devices include a display 211, a network connection 212, a computer-readable media drive 213, and various other I/O devices 215. An embodiment of the Content Provider System 250 is executing in memory, and it includes a Control Instruction Receiver component 252, a Content Selector component 254, and a Content Transmitter component 256. The Control Instruction Receiver component receives content control instructions from STBs via the network connection 212 and notifies the Content Selector component of the instructions. The Content Selector component then selects appropriate content to be provided to the STB that provided an instruction, such as to satisfy the received instruction and/or to satisfy other constraints (e.g., to provide advertisements or other information), and notifies the Content Transmitter component to send the selected content to the STB via the network connection 212. Various types of content can be provided by the Content Transmitter component, including some or all of third-party content received from a content provider 265, or various content stored in an accessible network location. In the illustrated embodiment, various content is stored on storage 220, including ads 221, trailers 222, video segments 223, audio segments 224, and other content 225. In addition, various subscriber/viewer information 229 is included on storage 220, and can be provided to an STB when appropriate (e.g., to display the status of a subscriber's account).

An embodiment of the Audience Real-Time Tracker System 240 is also executing in memory, and it includes an STB Interaction Event Receiver component 242 and an STB Status Monitor component 244. The STB Interaction Event Receiver component receives interaction events sent by Interaction Monitor components 284 of various STBs, and stores some or all of the interaction events as appropriate in an Audience Interaction Event Database that is in a network-accessible location, such as the database 226 on storage 220. The STB Status Monitor component initiates status messages to Interaction Monitor components on STBs via the network connection 212, such as to gather information about the STBs and/or the viewers of the STBs. Information sent in response to status messages can in some embodiments be routed to the STB Status Monitor component and in other embodiments can be generated as events and provided to the STB Interaction Event Receiver component. If the STB Status Monitor component receives information from the Interaction Monitors, it can store that information in the Audience Interaction Event Database if appropriate in a manner similar to that of the STB Interaction Event Receiver. Information from STBs that includes changes to subscriber/viewer information can be stored in the subscriber/viewer information on the storage, regardless of whether the information is received by the Audience Real-Time Tracker System or the Content Provider System.

In the illustrated embodiment, each of the STBs includes various components executing in memory, including a UI Generator component 282, an Interaction Monitor component 284, a Powerdown Notifier component 286, and a Content Receiver/Supplier component 288. The UI Generator component interacts with viewers (e.g., receives instructions from them) and provides/modifies content that is sent to an associated TV or other display via the display output port 276 on the STB. As previously noted, the Interaction Monitor component provides various interaction event information to the Audience Real-Time Tracker System, and the Powerdown Notifier component provides indications of sudden powerdown events to the Audience Real-Time Tracker System (e.g., via the Interaction Monitor component). The Content Receiver/Supplier component receives content from the Content Provider System and/or other content providers 265, and supplies the content to the display output port. The Content Receiver/Supplier component may also interact with the UI Generator component when supplying content, such as to select one of multiple channels being provided or to add content provided by the UI Generator in place of or in addition to other content being supplied.

Each STB also includes a CPU 274 and a network connection 272. In addition, in some embodiments the STB may include a temporary power backup mechanism (e.g., a battery), not shown, to-assist with the powerdown notification. If so, the Powerdown Notifier component will send a notification of a powerdown event to the Audience Real-Time Tracker System using the temporary power from the backup mechanism. Each STB in the illustrated embodiment also includes a storage 290 that includes various information, including a unique identifier for that STB 292, network address information for the Audience Real-Time Tracker System 294, and optionally network address information for the Content Provider System 296. In some embodiments, the network address information allows the Interaction Monitor to send information as needed to the Audience Real-Time Tracker System and/or to the Content Provider System, while in other embodiments the Interaction Monitor may simply transmit along a non-shared output transmission line (e.g., a DSL line) and the information will be supplied to the computing device 200. In other embodiments, the storage may also include other types of information, such as information specific to one or more subscriber/viewers associated with that STB.

Various Real-Time Content Enhancement Services 260 are also executing in memory in the illustrated embodiment, although those skilled in the art will appreciate that some or all of these may not be present in other embodiments, and that such content enhancement services could instead execute on other computing devices. In the illustrated embodiment, the Content Enhancement Services include a Multi-Cast Ad Selector component 261, a Single-Cast Ad Selector component 262, a Viewer Authorization Detector component 263, a Remote Monitor Access component 264, a Multi-Channel Ad Tracker component 266, a Content Popularity Tracker component 267, an Ad Reaction Tracker component 268, and a Single-Cast UI Adjustment component 269.

Each of the Content Enhancement Services can retrieve real-time or near real-time information related to content being provided to viewers and/or other interaction events, such as from the Audience Interaction Event Database and/or from the STB Interaction Event Receiver, and can provide various enhanced content and/or functionalities based on processing such information. For example, as described in greater detail below, the Multi-Cast Ad Selector component can monitor the viewers of a multi-cast in real-time and can modify the content being provided in various ways, such as by selecting an ad or other content to be provided based on real-time changes in the overall demographics of viewers, based on real-time changes in the overall number of viewers, etc. In some embodiments, the component could identify appropriate content to be provided to various subsets of the current viewers of the multi-cast, and the existing multi-cast could be separated into multiple multi-casts and/or single-casts (e.g., on a temporary basis) to receive the different identified content. The Single-Cast Ad Selector component operates in a similar manner to the Multi-Cast Ad Selector component, but can make decisions as to content to be provided on various other factors, such as information specific to the one or more viewers that are receiving the single-cast.

The Viewer Authorization Detector component can monitor STBs that are receiving content in order to verify that they are authorized STBs and that they are authorized to receive their current content, such as by analyzing interaction events received from those STBs, detecting when expected interaction events are not received from those STBs, and/or querying those STBs periodically to provide identification and/or authorization information. The Remote Monitor Access component allows authorized personnel to remotely monitor content being provided to one or more STBs and/or to monitor interactions by viewers with those STBs, such as to allow a parent to monitor their children from a remote location or to allow a teacher to monitor multiple students. The Multi-Cast Channel Ad Tracker component tracks the display of ads or other content across multiple channels (e.g., different TV channels) and analyzes information related to each of those display occurrences (e.g., audience demographics and/or date and time of the occurrence). The component then uses that analyzed information in conjunction with other factors related to the display of the content, such as the content selection factors 227 on storage (e.g., contractual obligations or legal restrictions on types of content based on viewer or time), and determines whether and how the content should be displayed again and/or modifies content selection parameters in order to correct a content selection problem that occurred.

The Content Popularity Tracker component analyzes all of the content currently being provided to various viewers, and determines a current most popular content based on real-time viewing information. This information can then be used to determine ads or other content to be displayed on the most popular content streams, to allow other viewers to select to join a multi-cast of the current most popular content, and/or for various other business uses. The Ad Reaction Tracker component monitors previous and/or future displays of a specified ad or other type of content, and analyzes simultaneous and closely subsequent interaction events to determine information about viewers reaction to the content (e.g., to detect disapproval by viewers immediately changing content). The Single-Cast UI Adjustment component monitors interaction events for a single-cast or a specified STB in order to provide functionality specific to the interaction events performed by those-viewers. For example, if a viewer has exceeded or is close to exceeding a preset limit (e.g., a specified amount of time on a premium content service), the component can provide a warning to the viewers. Similarly, if a single-cast is limited to a specified amount of time and the viewers have used VCR-style commands to extend the normal playing time in such a manner that the presentation of the remaining amount of content will require the entire remaining amount of time available, the component could provide a warning and/or could disable some or all of the UI functionality provided to those viewers (e.g., the VCR-style controls that stop, rewind, or slow the presentation of that content). Those skilled in the art will appreciate that a variety of other similar types of content enhancement services could be provided in other embodiments.

Those skilled in the art will appreciate that computing device 200 and STB computing devices 270 are merely illustrative and are not intended to limit the scope of the present invention. The computing devices may be connected to other devices that are not illustrated, including through one or more networks such as the Internet or via the World Wide Web (WWW). In addition, the functionality provided by the illustrated system components may in some embodiments be combined in fewer components or distributed in additional components. Similarly, in some embodiments the functionality of some of the illustrated components may not be provided and/or other additional functionality may be available.

Those skilled in the art will also appreciate that, while various items and components are illustrated as being stored in memory while being used, these items or portions of them can be transferred between memory and other storage devices for purposes of memory management and data integrity. Similarly, items illustrated as being present on storage while being used can instead be present in memory and transferred between storage and memory. Some or all of the components or data structures may also be stored (e.g., as instructions or structured data) on a computer-readable medium, such as a hard disk, a memory, a network, or a portable article to be read by an appropriate drive. The components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

In the illustrated embodiment, systems interact over the Internet and/or switched telephone network, and the computing devices being monitored are STBs connected to TVs or other presentation devices. Those skilled in the art will appreciate that the disclosed techniques can be used with various other types of networks and computing devices, including computers, network devices, internet appliances, PDAs, wireless phones, pagers, electronic organizers, and various other consumer products that include inter-communication capabilities.

FIG. 3 illustrates an example of an interaction event data structure 300 that can be used to report various types of interaction events. In the illustrated embodiment, the data structure includes various fields 370 and various corresponding values 380. The illustrated interaction event data structure includes fields for a unique identifier for the event, an indication of event type, physical and logical network addresses corresponding to the STB that generated the event, identifiers for the subscribers and/or viewers related to the event, date/time start and end information (if appropriate), an identifier for a specified item or URL (if appropriate), and various types of error message information (if appropriate). Those skilled in the art will appreciate that in other embodiments information could be structured in other ways, such as by using different data structures for each type of event and/or including other types of information in the data structures.

Figure 4:
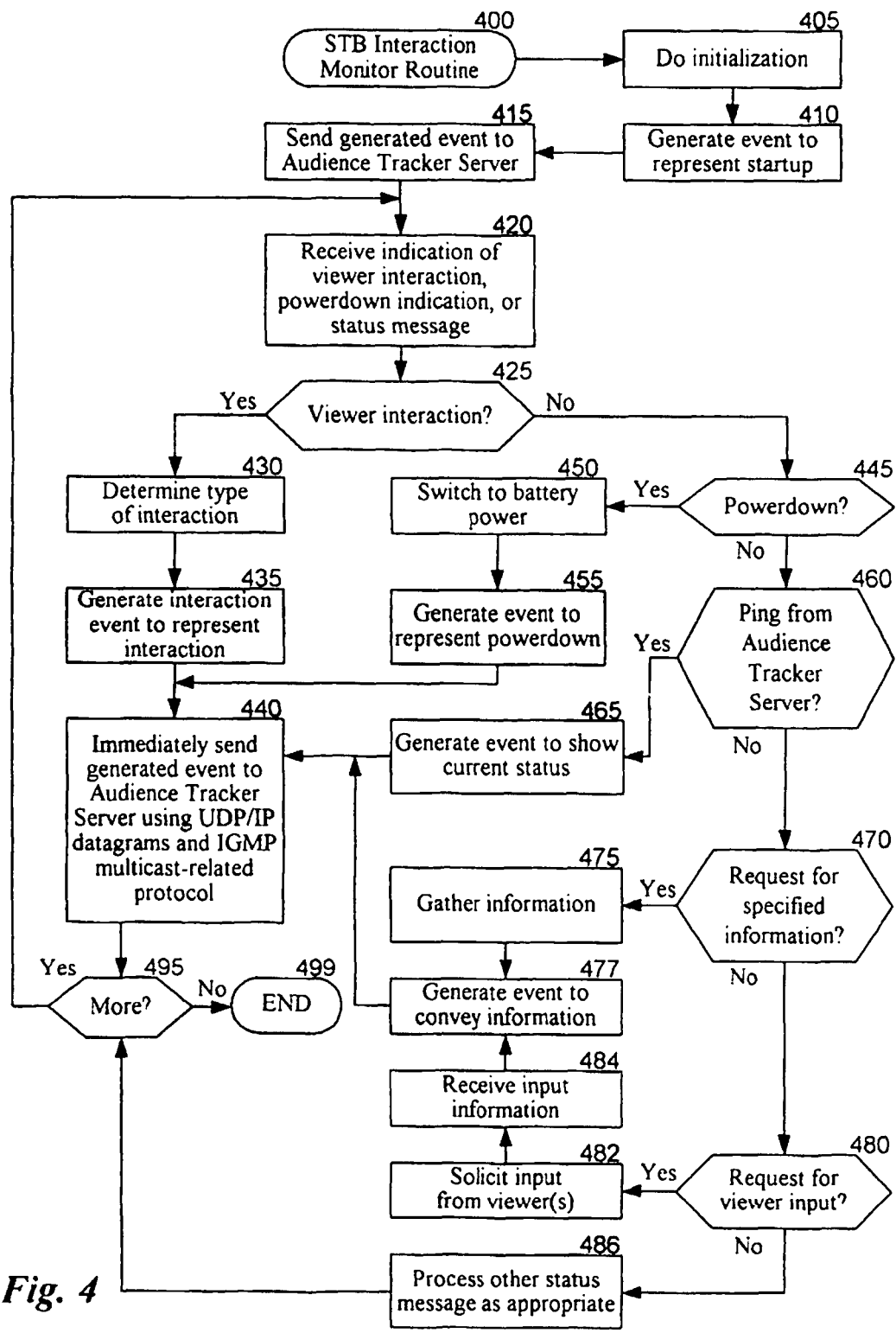
FIG. 4 is a flow diagram of an embodiment of the STB Interaction Monitor routine.

FIG. 4 is a flow diagram of an embodiment of the STB Interaction Monitor Routine 400. The routine provides information to an Audience Tracker Server about interaction events that occur on an STB, and responds to received status messages from the Audience Tracker Server as appropriate. The routine begins at step 405 where an initialization is performed during start-up of the STB. In step 410, an event is generated to represent the start-up, such as to indicate a default content or initially selected content that is being provided, and in step 415 the generated event is sent to the Audience Tracker Server.

In step 420, an indication is received of a viewer/subscriber interaction, an indication of a powerdown event, or a status message. The routine continues to step 425 to determine if a viewer interaction occurred, and if so continues to step 430 to determine the type of the interaction. In step 435, an interaction event is generated to represent the interaction, and in step 440 the generated event is immediately sent to the Audience Tracker Server in real-time, such as by using an UDP/IP datagram in conjunction with the IGMP multi-cast-related protocol. Those skilled in the art will appreciate that in other embodiments only some types of interactions may be indicated to the Audience Tracker Server, and that some or all of the generated interaction events may not be immediately sent to the Audience Tracker Server.

If it was instead decided in step 425 that the received indication was not a viewer interaction, the routine continues to step 445 to determine if a powerdown indication was received. If so, the routine continues to step 450 to switch to battery power while an event is generated in step 445 to represent the powerdown and is immediately sent in step 440 to the Audience Tracker Server. If the indication was not for a powerdown, the routine instead continues to step 460 to determine if a Ping message was received from the Audience Tracker Server, such as by using ICMP. If so, the routine continues to step 465 to generate an event to show the current status of the STB, and then continues to step 440. If the indication was not a Ping message, the routine continues to step 470 to determine if a status message was received that requests specified information. If so, in step 475 the routine gathers the information in the appropriate manner and continues to step 477 to generate an event to convey the information before sending the generated event to the Audience Tracker Server in step 440.

If the received indication was not a request for specified information, the routine continues to step 480 to determine if the indication was a request for input from one or more of the current viewers. If so, the routine continues to step 482 to solicit the specified input from the viewers, to receive the information from them in step 484, and to then continue to step 477. If the request was not for viewer input, the routine instead continues to step 486 to process the other received status message as appropriate. After steps 440 or 486, the routine continues to step 495 to determine if more monitoring is to be performed. If so, the routine returns to step 420, and if not the routine continues to step 499 and ends.

Figure 5:
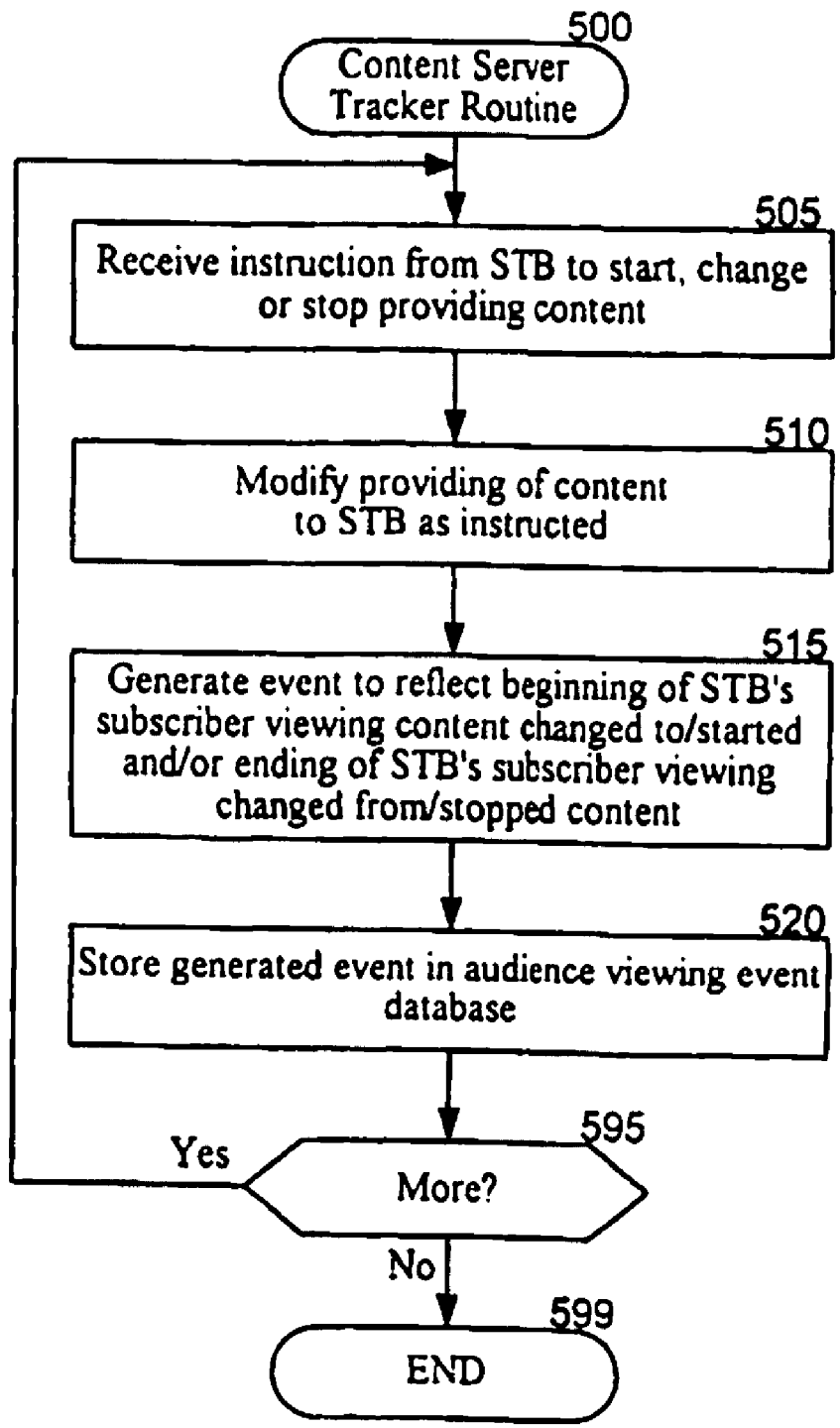
FIG. 5 is a flow diagram of an embodiment of the Content Server Tracker routine.

FIG. 5 is a flow diagram of an embodiment of the Content Server Tracker Routine 500. In step 505, the routine receives an instruction from an STB to start, change or stop providing specified types of content. In step 510, the routine modifies the content that is provided to the STB as instructed. In the illustrated embodiment, the Content Server tracks content control instructions received from viewers, and thus in step 515 the routine generates an event to reflect the beginning of the STB's subscriber(s) viewing the specified content that was started or changed to, and/or the ending of the STB's subscriber(s) viewing of the specified content that was stopped or changed from. In step 520, the generated event is stored in the Audience Viewing Event Database. In step 595, the routine determines whether to continue. If so, the routine returns to step 505, and if not the routine continues to step 599 and ends.

Figure 6:
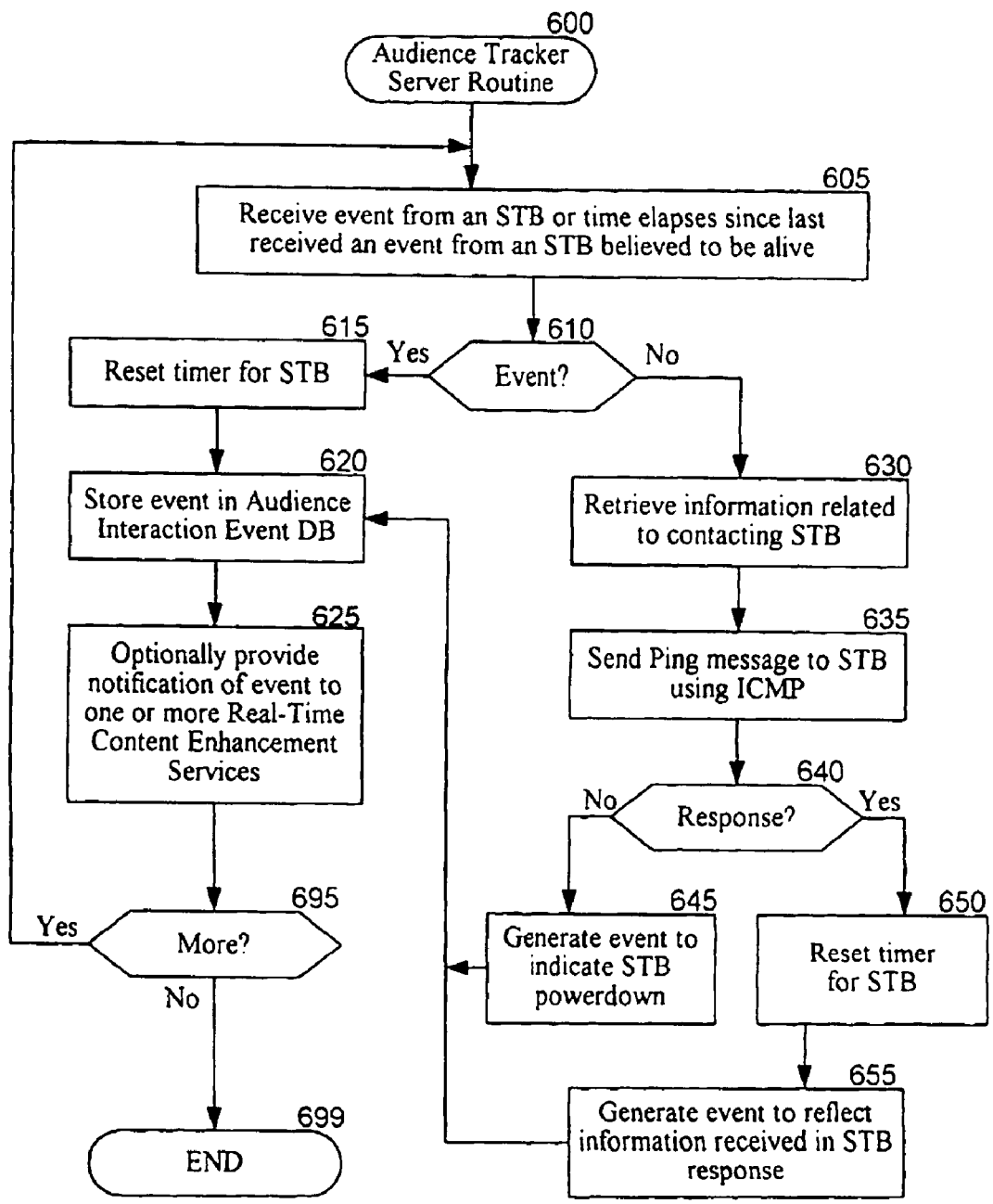
FIG. 6 is a flow diagram of an embodiment of the Audience Tracker Server routine.

FIG. 6 is a flow diagram of an embodiment of the Audience Tracker Server Routine 600. The routine receives an indication of an event from an STB or an indication that a time period has elapsed since an event was last received from an STB that is believed to be alive. The routine continues to step 610 to determine if an event was received, and if so continues to step 615 to reset a corresponding timer for that STB whose expiration causes the Audience Tracker Server to Ping that STB. The routine then continues to step 620 to store the received event in the Audience Interaction Event Database. In step 625, the routine optionally provides notification of the event to one or more of the Real-Time Content Enhancement Services, such as if that service had previously requested or registered to receive such notification.

If it was instead determined in step 610 that an event was not received, the routine continues to step 630 to retrieve information related to contacting the STB for whom the time period elapsed, such as a network address and/or security or authorization information needed to receive information from that STB. The routine then continues to step 635 to send a Ping message to the STB using ICMP. In step 640, it is determined whether a response is received. If so, the routine continues to step 650 to reset the timer for the STB, and then in step 655 generates an event to reflect information received in the STB response. If a response was not received, the routine instead continues to step 645 to generate an event to indicate that the STB has powered down. After steps 645 or 655, the routine continues to step 620. After step 625, the routine determines in step 695 whether to continue. If so, the routine returns to step 605, and if not the routine continues to step 699 and ends.

Figure 7:
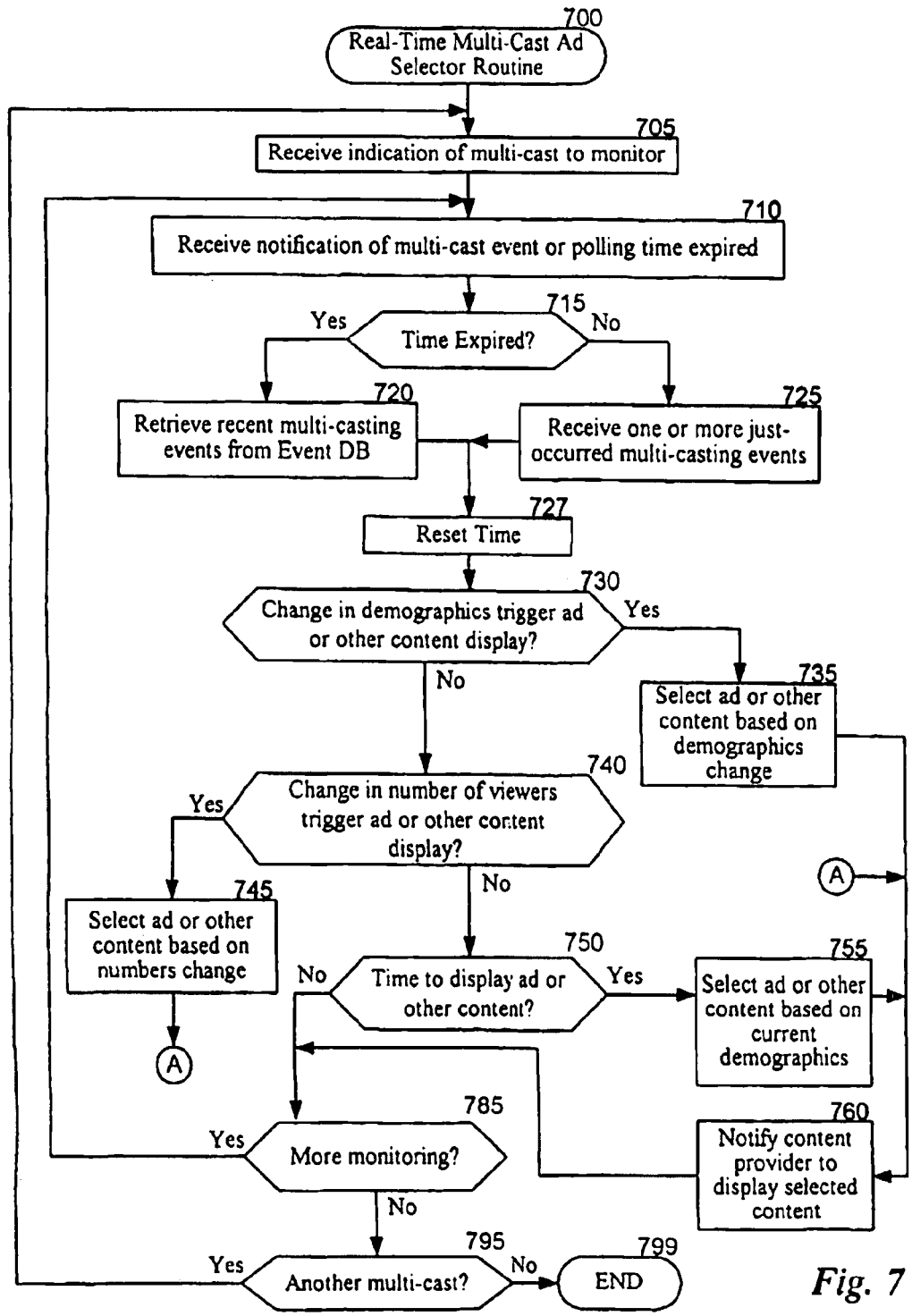
FIG. 7 is a flow diagram of an embodiment of the Real-Time Multi-Cast Ad Selector routine.

FIG. 7 is a flow diagram of an embodiment of the Real-Time Multi-Cast Ad Selector Routine 700. The routine begins in step 705 where an indication is received of a multi-cast to monitor. In step 710, the routine receives an indication of an event related to that multi-cast or an indication that a polling time has expired, such as a polling time selected to be less than a time period related to the content of the multi-cast. For example, if the multi-cast involves displaying a TV program, the polling time may be selected such that a certain number of events will be gathered during the program or during a period of time of the program leading up to an advertisement to be displayed.

In step 715, the routine then determines if the polling time has expired, and if so, continues to step 720 to retrieve recent events related to the multi-cast from the event database. If it is instead determined in step 715 that the time is not expired, the routine continues to step 725 to receive one or more events that just occurred that are related to the multi-cast. After steps 720 or 725, the routine continues to step 727 to reset the polling time, and then continues to step 730 to determine if the recent interaction events indicate a change in the audience demographics that is sufficient to trigger the display of an ad or other content, such as if the change reaches a threshold based on total number of viewers, rate of change of number of viewers, types of viewers within a specified demographic group, etc. If so, the routine continues to step 735 to select an ad or other content based on the demographics change, and then continues to step 760 to notify the Content Provider to display the selected content.

If it was instead determined in step 730 that a change in demographics did not trigger an ad or other content display,. the routine continues to step 740 to determine if a change in a total number of viewers is sufficient to trigger the display of an ad or other content. If so, the routine continues to step 745 to select an ad or other content based on the change in total numbers or the current total number, and then continues to step 760. If a change in the total number of viewers did not trigger a display of content, the routine continues to step 750 to determine if it is time to display an ad or other content, such as at a regularly-scheduled time. If so, the routine continues to step 755 to select an ad or content based on the current demographics, and then continues to step 760. After step 760, or if it was not time to display an ad, the routine continues to step 785 to determine if more monitoring of the multi-cast should be performed. If so, the routine returns to step 710, and if not the routine continues to step 795 to determine if another multi-cast should be monitored. If so, the routine returns to step 705, and if not the routine continues to step 799 and ends.

Figure 8:
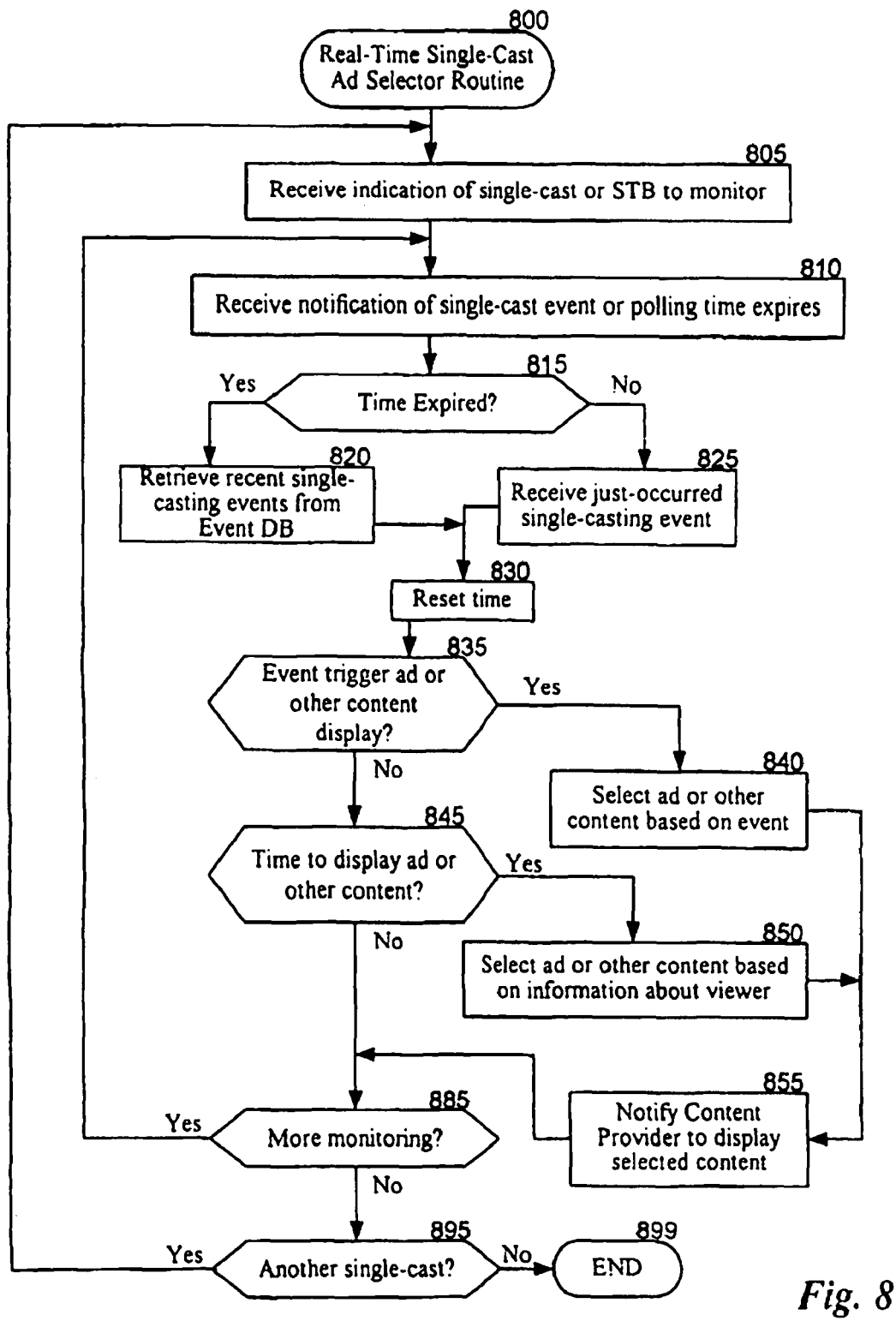
FIG. 8 is a flow diagram of an embodiment of the Real-Time Single-Cast Ad Selector routine.

FIG. 8 is a flow diagram of an embodiment of the Real-Time Single-Cast Ad Selector Routine 800. The routine begins at step 805 where an indication is received of a single-cast or an STB to monitor. In steps 810-830 the routine executes in a manner similar to that of steps 710-727 in FIG. 7, in particular by receiving one or more recent or just-occurred events related to the single-cast to the STB by either polling the event database or receiving notification of the events. After resetting the time related to the polling in step 830, the routine continues to step 835 to determine whether one or more of the received events trigger the display of an ad or other content. For example, if it is important or desirable to complete the presentation of a piece of content (e.g., an ad) that has begun, that content could continue to be displayed even if the user provides content control instructions to the contrary (e.g., changing a channel away from one on which the ad was previously being displayed, such as part of a multi-cast). The content presentation continuation could be performed in various ways, such as by preventing the requested content change until the presentation is done or by adding the continuing presentation of the previous content to the newly selected content.

If a content display is triggered, the routine continues to step 840 to select an ad or other content based on the event, and then continues to step 855 to notify the Content Provider to display the selected content. If the event did not trigger the display of content, the routine instead continues to step 845 to determine whether it is time to display an ad or other content, such as based on a designated time for ad display. If so, the routine continues to step 850 to select an ad or other content based on information about the current viewers, and then continues to step 855. After step 855, or if it was determined that it was not time to display content, the routine continues to step 885 to determine if more monitoring is to be performed for the single-cast. If so, the routine returns to step 810, and if not the routine continues to step 895 to determine whether to monitor another single-cast. If so, the routine returns to step 805, and if not the routine continues to step 899 and ends.

Figure 9:
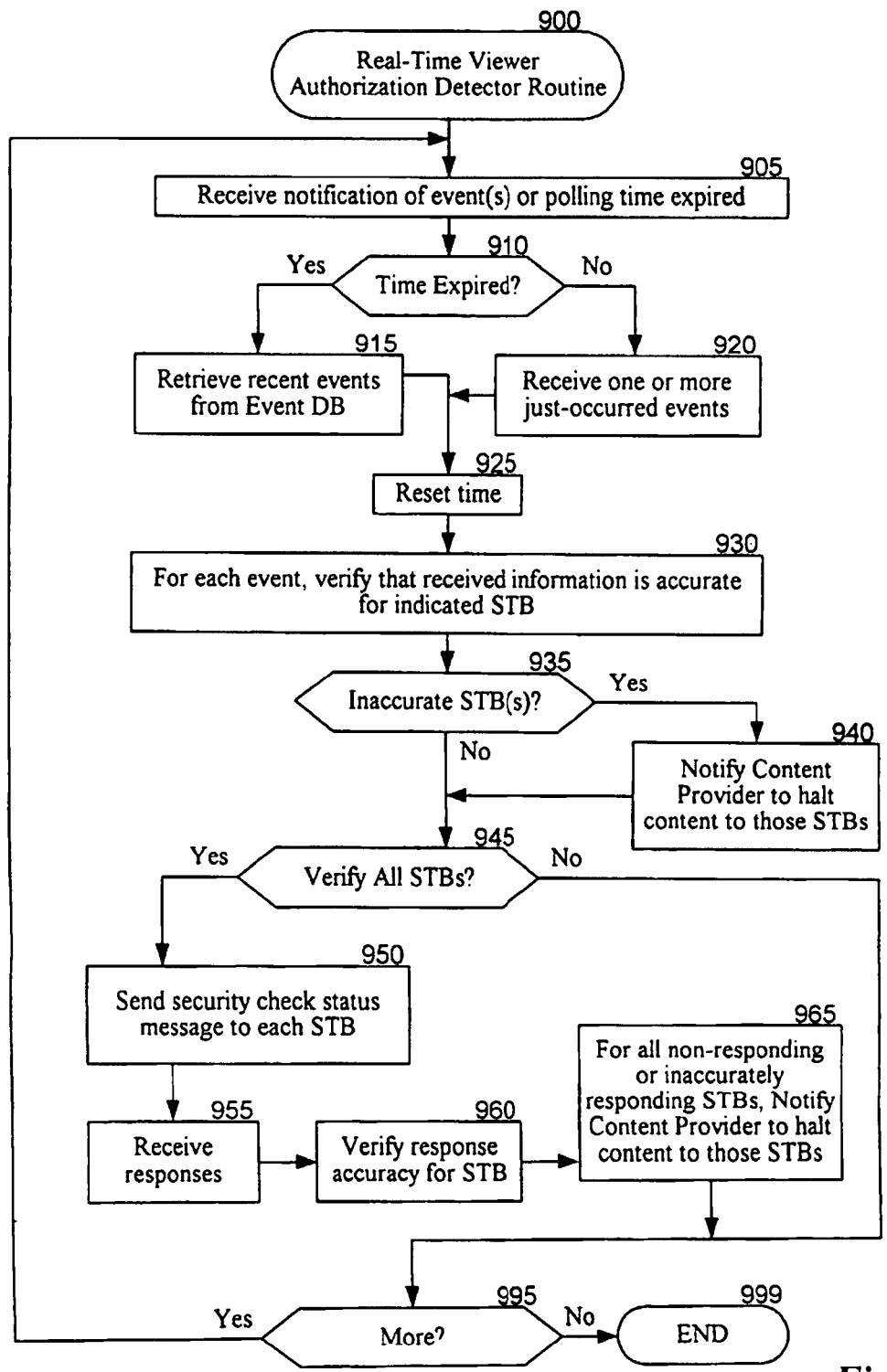
FIG. 9 is a flow diagram of an embodiment of the Real-Time Viewer Authorization Detector routine.

FIG. 9 is a flow diagram of an embodiment of the Real-Time Viewer Authorization Detector Routine 900. The routine begins at step 905, where an indication is received of an occurrence of one or more events or that a time for polling has expired. In steps 910-925, the routine continues in a manner similar to that of steps 815-830 of FIG. 8, in particular receiving or retrieving one or more recent events. After the polling time is reset in step 925, the routine continues to step 930 to verify for each received event that the information received as part of that event is accurate for the STB corresponding to the event, such as by verifying that network addresses used correspond to the STB that is associated with an ID specified for the STB or correspond to viewers/subscribers that are identified, or that appropriate authorization or security information is included. In step 935, it is determined if one or more STBs are inaccurate, and if so the routine continues to step 940 to notify the Content Provider to halt content provision to those STBs. In alternate embodiments, such as if those STBs are receiving content instead from a third-party content provider, the UI component of the STB could instead be notified to prevent display of the content.

After step 940, or if no STBs are determined to be inaccurate, the routine continues to step 945 to determine whether all currently connected STBs should be verified. If so, the routine continues to step 950 to send a security check status message to each STB in order to prompt that STB to provide appropriate authorization information. In step 955 responses are received, and in step 960 the responses are verified for accuracy based on the STB. In step 965, all non-responding or inaccurate STBs have their content halted by, in the illustrated embodiment, notifying the Content Provider to halt content delivery. In other embodiments, STBs could be identified as being inaccurate based not on inaccurate information that they supplied, but instead on a lack of information (either any information or accurate information) that is provided by the STB, either instead of or in addition to the illustrated techniques. After step 965, or if it was determined in step 945 not to verify all of the STBs, the routine continues to step 995 to determine whether to continue processing. If so, the routine returns to step 905, and if not the routine continues to step 999 and ends.

Figure 10:
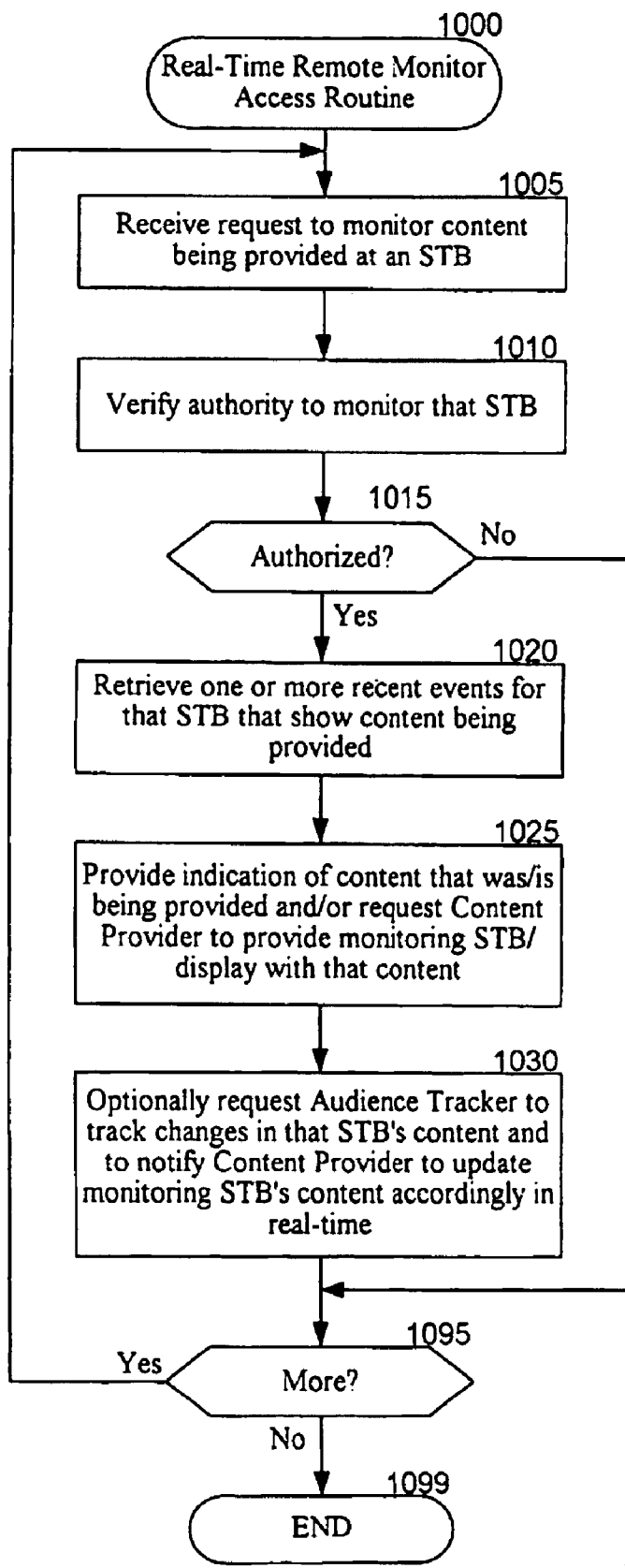
FIG. 10 is a-flow diagram of an embodiment of the Real-Time Remote Monitor Access routine.

FIG. 10 is a flow diagram of an embodiment of the Real-Time Remote Monitor Access Routine 1000. The routine begins at step 1005, where a request is received to monitor content that is being provided at an STB or to monitor interactions being performed at that STB. The routine continues to step 1010 to verify authority of the requestor to monitor that STB, such as based on a verified identification of that person as a previously designated authority or based on appropriate security information that is provided.

If it is determined in step 1015 that the requester is authorized, the routine continues to step 1020 to retrieve one or more recent events for that STB that show the content being provided and/or the types of interactions being performed, such as from the event database or directly from the Audience Tracker Server. In step 1025, an indication of the type of content that was and/or is being provided to the monitored STB is indicated, and/or the Content Provider is requested to provide the monitoring STB with the same content as is being supplied to the monitored STB (e.g., by joining a multi-cast to which that monitored STB belongs). In step 1030, the routine optionally requests the Audience Tracker Server to track continuing changes in that monitored STB's content and to notify the Content Provider to continue to update the monitoring STB's content accordingly in real time, such as if the monitoring STB is not part of the same multi-cast as the monitored STB or to detect a change away from that multi-cast by the monitored STB. The routine then continues to step 1095 to determine whether to continue monitoring, and if so returns to step 1005. If not, the routine continues to step 1099 and ends.

Figure 11:
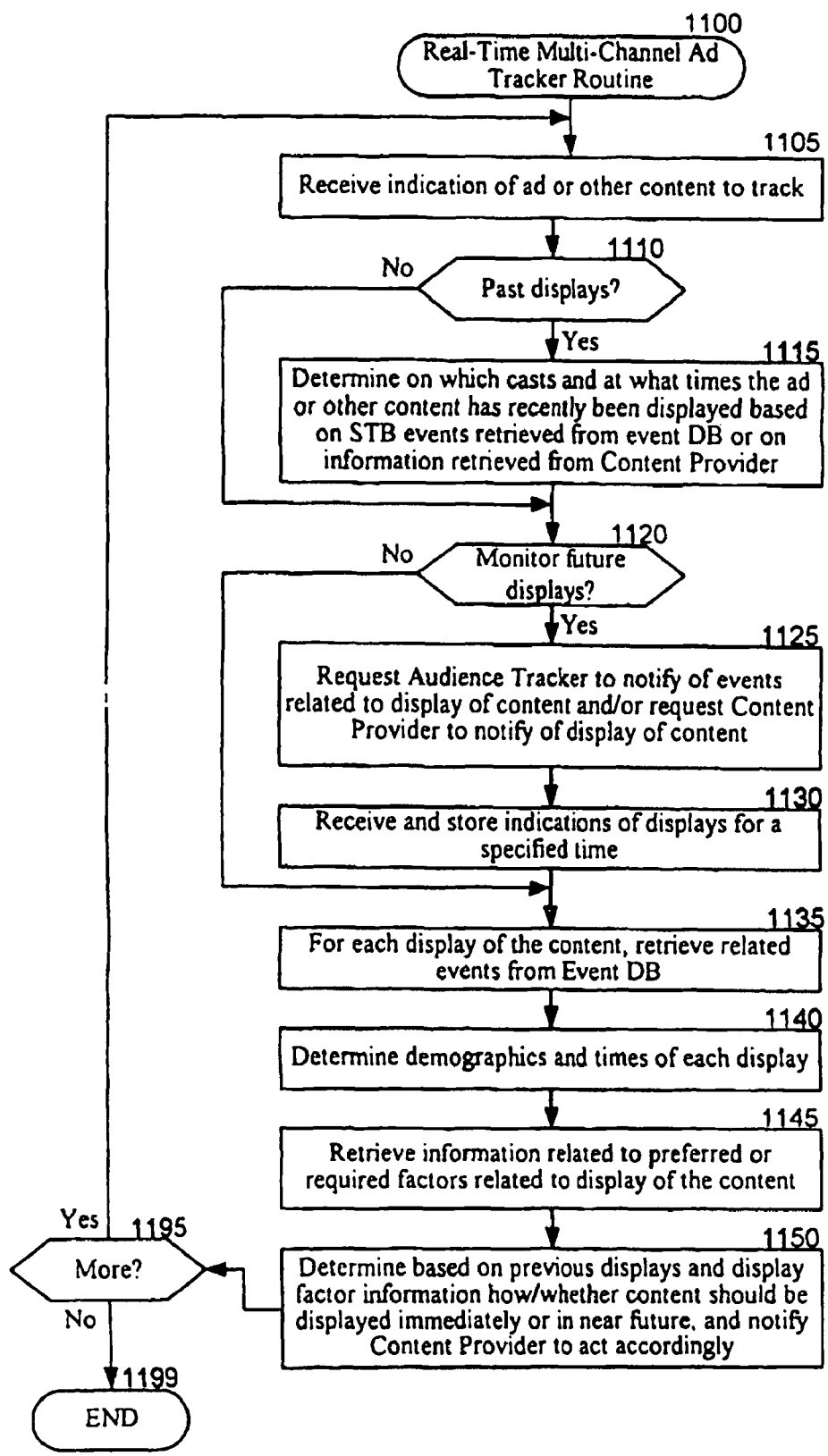
FIG. 11 is a flow diagram of an embodiment of the Real-Time Multi-Channel Ad Tracker routine.

FIG. 11 is a flow diagram of an embodiment of the Real-Time Multi-Channel Ad Tracker Routine 1100. The routine begins at step 1105, where an indication is received of an ad or of other content to track. The routine continues to step 1110 to determine whether to track past displays of that content, and if so continues to step 1115 where the event database or other information is examined to determine on which previous content casts (whether multi-casts, single-casts or broadcasts) and at what times the ad or other content has recently been displayed. After step 1115, or if it was determined in step 1110 not to monitor past displays, the routine continues to step 1120 to determine whether to monitor future displays, such as for a specified period of time. If so, the routine continues to step 1125 to request the Audience Tracker Server to provide notifications of events that occur related to the display of the content being tracked and/or to request the Content Provider to perform a similar notification. In step 1130, the routine then receives and stores indications of occurrences of displays of that content being tracked.

After step 1130, or if it was determined in step 1120 not to monitor future displays, the routine continues to step 1135 to retrieve any related events from the event database that correspond to the display of the content being tracked, such as events that occurred just prior to, just after, and/or during the display of the content. In step 1140, the demographics and times that correspond to each display are determined, and in step 1145 information is retrieved related to preferred or required factors related to how and when the content being tracked should be displayed. In step 1150, it is determined based on the previous displays and on the display factor information whether and how the content being tracked should be displayed again, either immediately or in the near future, and the Content Provider is notified to act accordingly. After step 1150, the routine continues to step 1195 to determine whether to perform additional processing. If so, the routine returns to step 1105, and if not the routine continues to step 1199 and ends.

Figure 12:
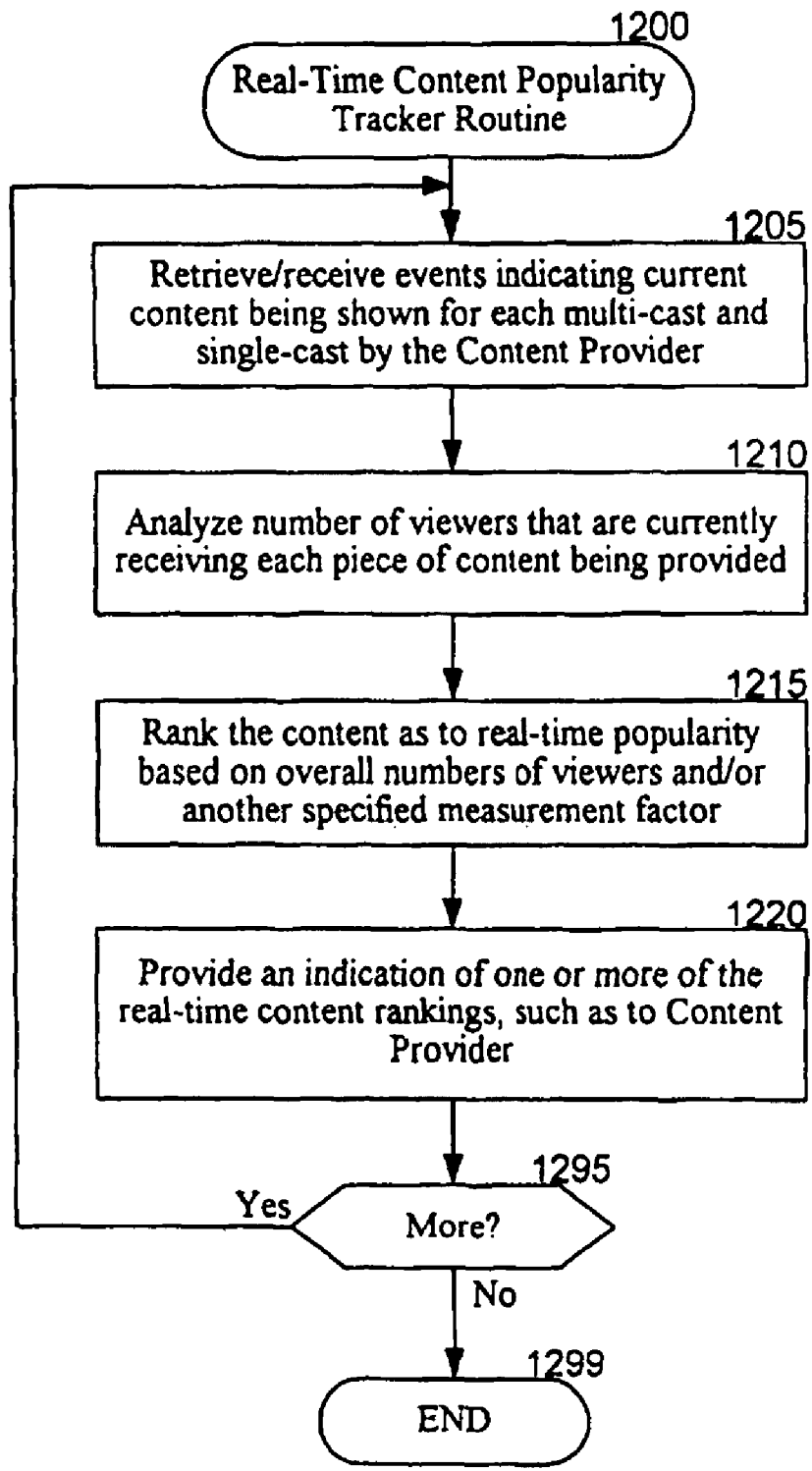
FIG. 12 is a flow diagram of an embodiment of the Real-Time Content Popularity Tracker routine.

FIG. 12 is a flow diagram of an embodiment of the Real-Time Content Popularity Tracker Routine 1200. The routine begins at step 1205, where events are received or retrieved that indicate the current content being shown for each multi-cast and single-cast provided by one or more Content Providers. In step 1210, the number of viewers that are currently receiving each distinct piece of content being provided are determined, and in step 1215 the various pieces of content are ranked as to the real-time popularity of that content, such as based on the overall number of viewers and/or on another specified measurement factor. In step 1220, the routine then provides an indication of one or more of the real-time content rankings, such as to the Content Provider to assist in selecting appropriate ads to display or to provide a service that allows a viewer to request to see whatever content is currently the most popular. The routine then continues to step 1295 to determine whether to do more processing. If so, the routine returns to step 1205, and if not the routine continues to step 1299 and ends.

Figure 13:
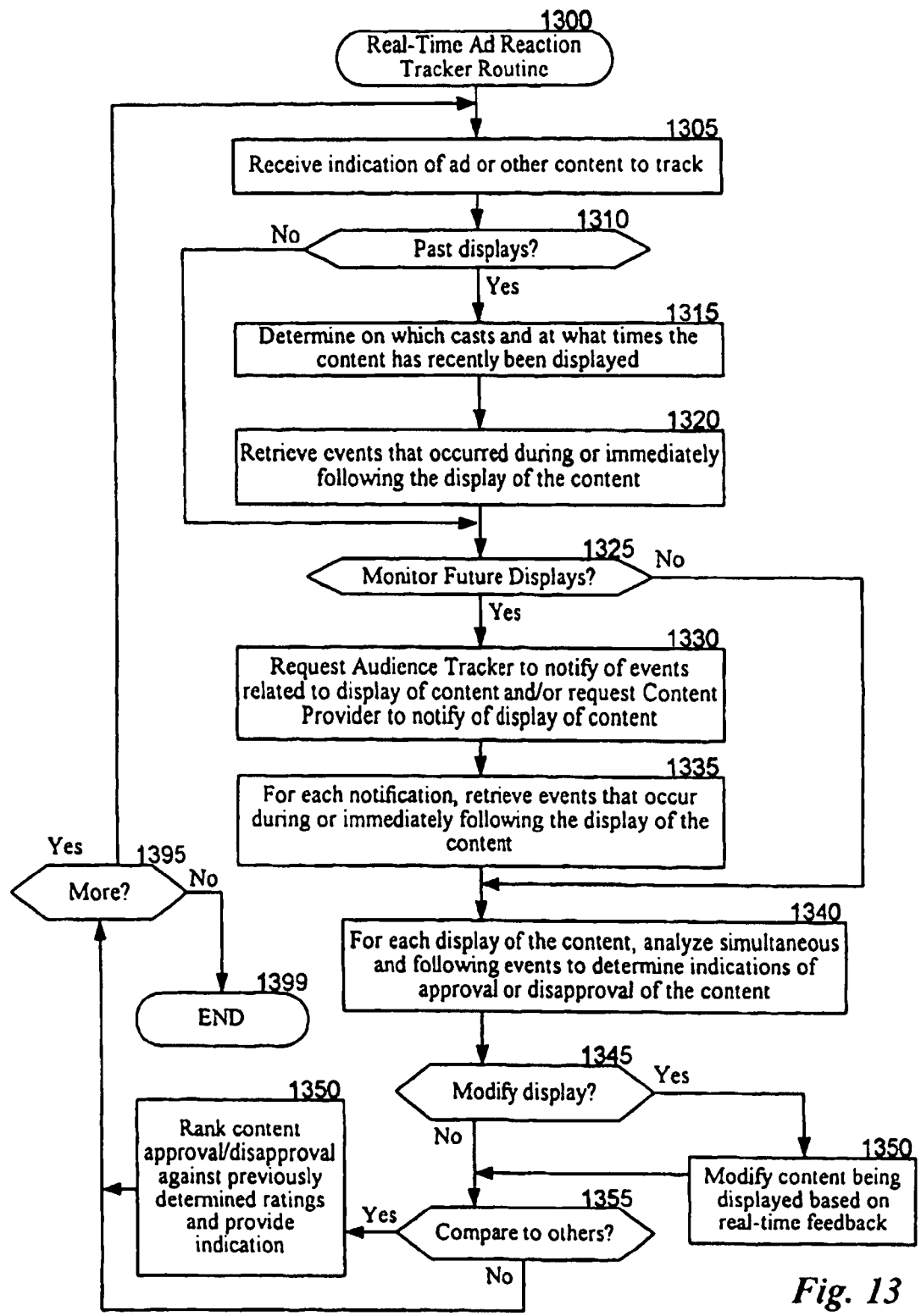
FIG. 13 is a flow diagram of an embodiment of the Real-Time Ad Reaction Tracker routine.

FIG. 13 is a flow diagram of an embodiment of the Real-Time Ad Reaction Tracker Routine 1300. The routine begins at step 1305, where an indication is received of an ad or of other content to be tracked. In a similar manner to that of steps 1110-1135 in FIG. 11, steps 1310-1335 of the routine determine whether to gather event information related to recent previous displays of the content being tracked and/or to future displays of the content being tracked, such as for a specified period of time. After events are received for each of one or more displays of the content, the events that occurred simultaneously or immediately following the display are analyzed in order to determine whether indications of approval or disapproval of the content can be determined based on the interaction events. For example, a large trend of viewers immediately turning to another channel once the content display began may indicate disapproval, while a large number of viewers joining the display just after it began may indicate approval (e.g., for a regularly scheduled program).

The routine then continues to step 1345 to determine whether to modify the content being displayed based on the analysis, such as to remove content having a high disapproval rating immediately, even if the content has not completed its presentation. If so, the routine continues to step 1350 to perform such content modification. After step 1350, or if it was determined in step 1345 not to modify the display, the routine continues to step 1355 to determine whether to compare the approval and/or disapproval ratings of the content being tracked to other content. If so, the routine continues to step 1360 to rank the content approval/disapproval ratings against those for previously determined approval/disapproval ratings, and provides an indication of the rankings. After step 1360, or if it was determined in step 1355 not to do the comparison, the routine continues to step 1395 to determine whether to continue processing. If so, the routine returns to step 1305, and if not the routine continues to step 1399 and ends.

Figure 14:
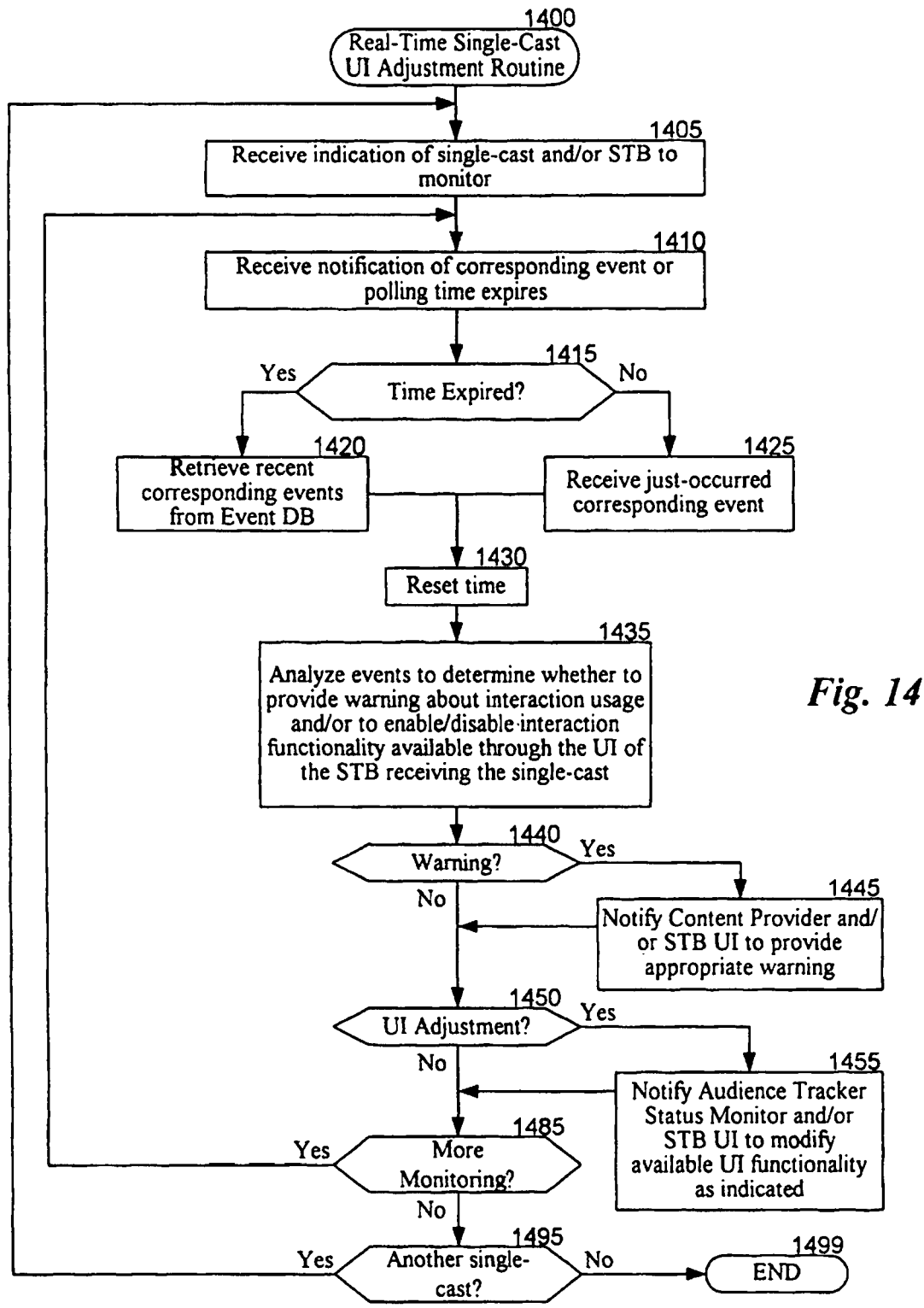
FIG. 14 is a flow diagram of an embodiment of the Real-Time Single-Cast UI Functionality Adjustment routine.

FIG. 14 is a flow diagram of an embodiment of the Real-Time Single-Cast UI Functionality Adjustment Routine 1400. The routine begins at step 1405, where an indication is received of a single-cast or of an STB to monitor. In a manner similar to that of steps 810-830 of FIG. 8, steps 1410-1430 of the routine identify recent events corresponding to the single-cast or the STB. After the polling time is reset in step 1430, the routine continues to step 1435 to analyze the events to determine whether to provide a warning about interaction usage, and/or to enable and/or disable interaction functionality provided through the UI of the STB receiving the single-cast. The routine then continues to step 1440 to determine whether to provide a warning, and if so continues to step 1445 to notify the Content Provider and/or the UI component of the STB to provide an appropriate warning. After step 1445, or if it was determined in step 1435 not to provide a warning, the routine continues to step 1450 to determine whether to provide an adjustment of the UI functionality provided. If so, the routine continues to step 1455 to notify the Audience Tracker Status Monitor and/or the UI component of the STB to modify the UI functionality that is made available to the viewers in a manner that is indicated. After step 1455, or if it was determined in step 1450 not to adjust the UI, the routine continues to step 1485 to determine whether to perform more monitoring. If so, the routine returns to step 1410, and if not the routine continues to step 1495 to determine whether to monitor another single-cast. If so, the routine returns to step 1405, and if not the routine continues to step 1499 and ends.

Those skilled in the art will also appreciate that in some embodiments the functionality provided by the routines discussed above may be provided in alternate ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

What is claimed is:

1. A method comprising:
at a Set-Top Box:
monitoring received input from one or more viewers, the Set-Top Box comprising a temporary power backup, the Set-Top Box comprising a software component adapted to send an event notification to an event server responsive to a determination that the Set-Top Box is no longer receiving AC power, the event notification indicating that the Set-Top Box is receiving power from the temporary power backup;
while the Set-Top Box is receiving AC power, in response to detecting that the received input is an interaction of a type of interest, sending an event message to the event server, the event message identifying the type of the detected interaction and an indication of the Set-Top Box and receiving new digital content responsive to the event message;
wherein the Set-Top Box uses a network connection for connection with the event server,
wherein the Set-Top Box communicates with the event server via packet-switched technology and IP packets,
wherein the event server is an Audience Tracker Server adapted to, based on the event message, dynamically rate content usage or enhance content.

2. The method of claim 1 wherein when a detected interaction is of a content control type that indicates a change in digital content, additionally sending an indication of the detected interaction to a content provider, so that the content provider can provide new digital content that corresponds to the indicated change.

3. The method of claim 1 wherein the sending of the event message is performed in real-time.

4. The method of claim 1 wherein the event message additionally includes information specific to a current occurrence of the detected interaction.

5. The method of claim 1 wherein the event message additionally includes information related to one or more of the one or more viewers.

6. The method of claim 1 wherein the Set-Top Box is connected to a display device on which video content is presented to the one or more viewers.

7. The method of claim 1 wherein the Set-Top Box is connected to one or more speakers on which audio content is presented to the one or more viewers.

8. The method of claim 1 wherein the Set-Top Box assists in presenting digital content to the one or more viewers by receiving the digital content and providing the digital content to a content presentation device.

9. The method of claim 8 wherein the content presentation device is a television.

10. The method of claim 1 wherein the Set-Top Box assists in presenting digital content to the one or more viewers by modifying received digital content before the digital content is provided to a content presentation device.

11. The method of claim 1 wherein the Set-Top Box assists in presenting digital content to the one or more viewers by generating content to be provided to a content presentation device.

12. The method of claim 1 wherein the event message is sent using a User Datagram Protocol.

13. The method of claim 1 including, in response to detecting a removal of AC power from the Set-Top Box, sending an event message to the event server indicating the removal of AC power.

14. The method of claim 1 including receiving a ping message from the event server, and in response sending a ping response message that indicates that the Set-Top Box is functioning.

15. The method of claim 1 including receiving a message from the event server requesting status information related to the Set-Top Box, and in response gathering the requested status information and sending the gathered information to the event server.

16. The method of claim 1 including receiving a message from the event server requesting information from the one or more viewers, and in response obtaining the requested information from the one or more viewers and sending the obtained information to the event server.

17. The method of claim 1 wherein the detected interaction is an instruction to change a channel.

18. The method of claim 1 wherein the detected interaction is an instruction to control flow of digital content being presented.

19. The method of claim 1 wherein digital content is sent from a content server to the Set-Top Box in a multi-cast mode.

20. The method of claim 1 wherein digital content is sent from a content server to the Set-Top Box in a single-cast mode.

21. The method of claim 1, wherein:
the event server forwards received event and/or status information to an event data base comprising real time information, including information indicating content being provided to a pluralty of Set-Top Boxes.

22. The method of claim 1, wherein:
the event server forwards received event and/or status information to an event data base comprising real time information, including information indicating content being provided to a pluralty of Set-Top Boxes, the event data base comprising powerdown status information for each of said plurality of Set-Top Boxes.

23. The method of claim 1, wherein:
the event server forwards received event and/or status information to an event data base comprising real time information, including information indicating content being provided to a pluralty of Set-Top Boxes, the event data base comprising real-time and near real-time information used to provide a content enhancement.

24. The method of claim 1, wherein:
the content enhancement is dependent on a real-time change of an overall number of viewers.

25. The method of claim 1, wherein:
said interaction is one of a subscriber/viewer -initiated event, a remote software update event, a subscriber/viewer-initiated error event, and a Set-Top Box error event.

26. A computer-readable storage device encoded with computer software adapted to cause a computing device to perform a method comprising:
at the computing device, monitoring received input from one or more viewers, the computing device comprising a temporary power backup, the computer software comprising a software component adapted to send an event notification to an event server responsive to a determination that the computing device is no longer receiving AC power, the event notification indicating that the Set-Top Box is receiving power from the temporary power backup; and
in response to detecting that the received input is an interaction of a type of interest, sending an event message to the event server that identifies the type of the detected interaction and that includes an indication of the computing device or of one or more of the one or more viewers and receiving new digital content responsive to the event message;
wherein the computing device uses a network connection for connection with the event server,
wherein the computing device communicates with the event server via packet-switched technology and IP packets,
wherein the event server is an Audience Tracker Server adapted to, based on the event message, dynamically rate content usage or enhance content.

27. The computer-readable storage device of claim 26 wherein the computing device is a Set-Top Box.

28. The computer-readable storage device, of claim 26 wherein the computer-readable medium is a memory of the computing device.

29. The computer-readable storage device of claim 26 wherein the method further comprises transmitting a generated data signal containing digital content.

30. The computer-readable storage device of claim 26 wherein the computer software comprises instructions that when executed cause the computing device to perform the method.

31. The computer-readable storage device of claim 26 wherein the computing device is an Audience Tracking Server.

32. A computing device comprising:
at the computing device, a monitoring component capable of monitoring received input from one or more viewers, the computing device comprising a temporary power backup, the computing device comprising a software component adapted to send an event notification to an event server responsive to a determination that the computing device is no longer receiving AC power, the event notification indicating that the Set-Top is receiving power from the temporary power backup; and
a notification component capable of, in response to detecting that the received input is an interaction of a type of interest, sending an event message to the event server that identifies the type of the detected interaction and that includes an indication of the computing device or of the one or more viewers and receiving new digital content responsive to the event message;
wherein the computing device uses a network connection for connection with the event server,
wherein the computing device communicates with the event server via packet-switched technology and IP packets,
wherein the event server is an Audience Tracker Server adapted to, based on the event message, dynamically rate content usage or enhance content.

33. The computing device of claim 32 wherein the monitoring component and the notification component are executing in memory of the computing device.

34. The computing device of claim 32 wherein the computing device is a Set-Top Box.

35. A computing device, comprising:
means for monitoring received input from one or more viewers, the computing device comprising a temporary power backup, the computer software comprising a software component adapted to send an event notification to an event server responsive to a determination that the computing device is no longer receiving AC power, the event notification indicating that the Set-Top Box is receiving power from the temporary power backup; and
means for, in response to detecting that the received input is an interaction of a type of interest, sending an event message to the event server that identifies the type of the detected interaction and that includes an indication of the computing device or of the one or more viewers and receiving new digital content responsive to the event message;

wherein the computing device uses a network connection for connection with the event server, wherein the computing device communicates with the event server via packet-switched technology and IP packets, wherein the event server is an Audience Tracker Server adapted to, based on the event message, dynamically rate content usage or enhance content.

* * * * *